United States Patent Office 3,389,670
Patented June 25, 1968

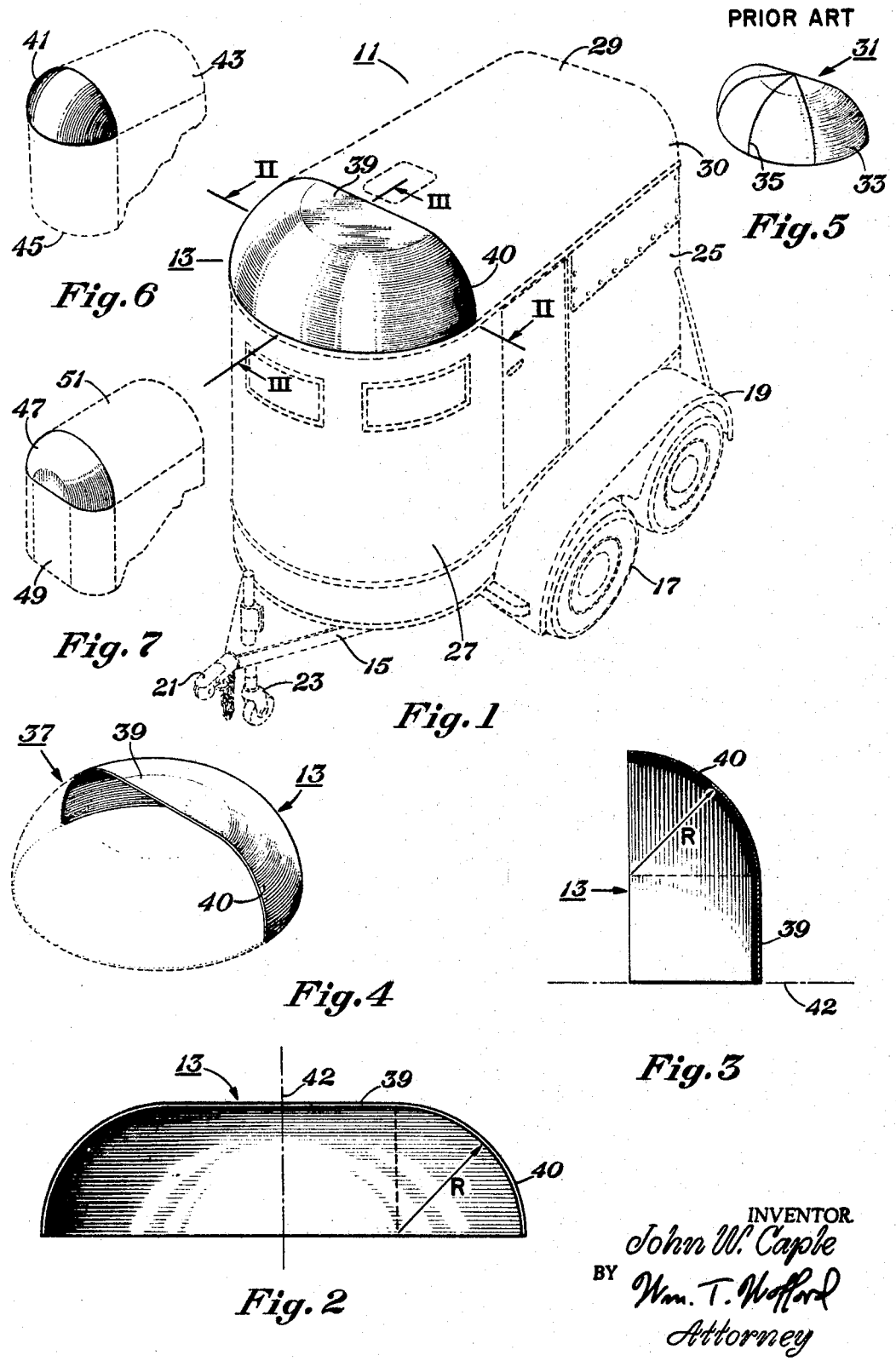

3,389,670
TRAILER CLOSURE MANUFACTURING
METHODS
John W. Caple, 6420 Rosemont,
Fort Worth, Tex. 76116
Filed Oct. 15, 1964, Ser. No. 404,070
4 Claims. (Cl. 113—116)

ABSTRACT OF THE DISCLOSURE

Method of forming a closure between the roof and front end wall of certain specialized type trailers, for example, horse trailers, which method involves spinning a cup-shaped part, and dividing it into two symmetrical parts, each of which becomes a said closure.

---

My invention relates in general to vehicular trailers and in particular to improved methods of manufacturing closure members for trailers.

In the trailer manufacturing industry an economic problem is created by the limited consumer demand for certain types of trailers. Where, for example, a small number of a particular type of trailer are required, high production machinery cannot economically be purchased for the manufacture thereof. Consequently, more hand labor or the use of machines which have a more limited output becomes necessary. This drives the cost of some types of trailers to a comparatively high level. This problem is, of course, not limited to the trailer manufacturing indusrty but is especially critical there since a surprisingly wide variety of trailer types are required when compared to the total trailer production.

One type of trailer found in the above problem category is the horse trailer. In recent years horse trailers having an unusually attractive apearance have become popular. Such trailers are commonly used by persons having show horses or horses used in rodeos and other public events. Yet the total number of trailers of this general type is comparatively small and the purchase of high production machinery by manufacturers is impractical. As a result, a great deal of hand labor is involved in the manufacture of these trailers.

For example, the closure which is inserted between the upper portion of the forward wall and the roof of a horse trailer is commonly formed of arcuate segmented pieces that are welded together, as is shown in FIG. 5 of the drawing. This method of manufacture requires the forming and cutting of separate segments, welding the segments together, and then grinding the resulting welds to create an attractive appearance. This is an expensive and seemingly outmoded way to fabricate the closure but nevertheless represents one of the most commonly used methods of horse trailer manufacture. Improved techniques are difficult to provide however since limited consumer demand for horse trailers makes the purchase of high production machinery prohibitively expensive.

The general object of my invention is to provide improved methods for manufacturing closure members for vehicular trailers.

Another object of my inventon is to provide an improved method for manufacturing the closure which joins an end wall and the roof of a trailer, said method being especially economical when low production rates prohibit the purchase of high production manufacturing equipment.

Another object is to provide a method for manufacturing a closure for trailers wherein the necessity for grinding or welding is eliminated.

Another object of my invention is to provide a method for manufacturing a closure for trailers said method permitting great variety in the configuration of the closure with little change in the manufacturing equipment.

These and other objects are effected by my invention as will be apparent from the following description, taken in accordance with the accompanying drawing, forming a part of this application in which:

FIG. 1 is a perspective view which illustrates a typical horse trailer in phantom but with the closure made in accordance with my invention at the upper portion of the front wall and the roof thereof shown in solid lines.

FIGS. 2 and 3 are sectional views taken respectively along the lines II—II and III—III of FIG. 1.

FIG. 4 is a perspective view of the closure with the lines in phantom used to complete the intermediate configuration of the closure before it reaches the finished product stage.

FIG. 5 is a perspective view showing a closure formed of four segments that have been welded together, a typical prior art method of manufacture.

FIG. 6 is a fragmentary perspective view of a closure that joins a cylindrical roof and a cylindrical front wall of a trailer.

FIG. 7 is a fragmentary perspective view of a closure that joins a cylindrical roof and an arcuate front wall of a trailer.

Referring now to the drawing and initially to FIG. 1, a horse trailer 11 of conventional design is illustrated in phantom except for the closure 13. The trailer has a frame 15 which supports in this instance four wheels 17 and fenders 19. Attachment means 21 are secured to the forward end of the frame 15 so that the trailer may be secured to an automotive vehicle. A movable wheel assembly 23 is provided so that the trailer may be maintained in a horizontal position when immobile. The trailer 11 has two vertical and parallel walls 25 which extend upwardly from the frame 15. These walls merge into a cylindrical configuration at their forward end. Specifically, the forward end 27 of the trailer is one-half of a longitudinally sectioned cylindrical shell, and the walls 25 are spaced apart a distance equal to the diameter of the cylinder. The roof or ceiling 29 of the trailer is arcuate in cross section, being symmetrical about the longitudinal axis of the elongated trailer 11 with downwardly curved surfaces 30 which merge into engagement with the walls 25. Arcuate roof 29 is, of course, perpendicular to wall 27.

The closure 13 between the cylindrical end wall 27 of the trailer and the arcuate or curved roof 29 has been formed in the prior art by a variety of methods, as was indicated previously. One of the most common prior art methods produces closures of the type illustrated in FIG. 5. This closure 31 is formed of four sections 33 which resembles sliced symmetrical portions of an orange peel. The sections 33 are joined by welding, which produces welds 35 that are visible in FIG. 5. The welds 35 (due to their rough and unsightly appearance) must be ground flush with the surfaces of the sections 33. Thus, producing closures by this method involves a great deal of hand labor, a feature that increases the cost of manufacturing the closure and the trailer.

The first step in my method is to spin a cup-shaped or hemispherical intermediate member 37 as is shown in FIG. 4. The term "cup-shaped" will be used hereinafter to encompass "hemispherical" as well as other related curved surfaces of revolution since a satisfactory generic term has not been found. It should be noted in FIGS. 1 through 4 that the cup-shaped member 13 has a flat surface 39. However, in FIG. 6 the closure 41 is truly hemispherical since both roof 43 and front wall 45 are cylindrical and of the same radius. In FIG. 7 the closure 47 has the same form as closure 13 of FIG. 1 but is oriented differently to accommodate the arcuate front wall 49 and the cylindrical roof 51. The term "cup-shaped" includes closures 13, 41 and 47.

As shown in FIGS. 1 through 4 of the drawing, especially in the sectional views of FIGS. 2 and 3, the closure 13 is flat at top portion 39 with a radius R forming the downwardly curved portions 40. The roof 29 has the same contour in transverse cross section as does the sectioned or divided edge of closure 13 (see FIG. 2). This contour is probably best described as "arcuate," a term that will be used repeatedly hereinafter.

In the FIGS. 1 through 4 illustrations it may appear that the closure 13 is a hemisphere that is flattened on the top. If this were true, the roof 29 of the trailer would be one-half of a cylinder that was flattened on top to match the flattened hemisphere or spheroid. This configuration is possible, of course, and within the scope of the term "arcuate" but nevertheless, is not the one illustrated. The sectional view of FIG. 3 shows that the cup-shaped closure 13 is a surface of revolution generated in theory by rotating one-quarter of a circle about an axis 42 (i.e. an axis spaced from the rotation axis of the radius R of the circle). The radius R may be varied at will, depending on how flat a trailer roof is desired.

Spinning per se is, of course, an old technique for metal forming, and will not be discussed in great detail for that reason. To add clarity to the description, however, I will briefly review spinning. Initially, a piece of sheet metal may be placed vertically in a machine of the lathe type, where it engages a die. The die and the sheet metal are secured to each other and rotated by the lathe. During rotation, a roller (supported by a holder which is free to move both longitudinally and transversely along the machine) is forced against the side of the sheet metal opposite the die. As the roller moves progressively across the sheet metal, a contour is developed in the sheet metal which conforms to that of the die. Various types of surfaces of revolution are formed by this method, the shape obtained being a function of the die configuration.

In accordance with my invention, closure elements or vehicular trailers are manufactured by first utilizing the spinning technique of metal forming to produce an intermediate elemeat, such as element 37 of FIG. 4, and then dividing the intermediate element into two symmetrical pieces, such as those having the shape indicated in solid lines in FIG. 4.

The realization that closures for the end walls and roof of trailers can be formed by the above method, is an outgrowth of the appreciation of the geometrical form that most trailers have or can be designed to have. If one surface or member (such as the end wall 27 of trailer 11) is one-half of a cylinder and another member (such as the roof 29 of trailer 11 (need to be joined by a smoothly contoured surface, then my method can be quite effectively and conveniently used. It should be once again noted that both the wall member and the roof member may be cylindrical and if so, the closure formed by my method will be a divided hemisphere. (See FIG. 6.) Also, the roof of trailer 11 may be cylindrical and the wall arcuate as in FIG. 7. There is, therefore, a surprising degree of versatility in the use of closures formed by my method.

Although the trailer 11 described in the foregoing description is a horse trailer, it is apparent that the type of trailer used is not critical and that my method may be used in the manufacture of other types of trailers.

Moreover, the type materials used for my closures were not dicusssed since any material may be used which can be formed by the spinning process and which is suitable for use in trailers in general. A typical material used in the construction of horse trailers is sixteen gauge, draw quality mild steel and this has been successfully with my method.

It is apparent from the foregoing that I have provided by this invention a closure manufactured by a method that has significant advantages.

An economical method for manufacturing closure members for vehicular trailers has been provided, especially for those trailers for which there is relatively low consumer demand and thus the use of high production equipment is prohibitively expensive. The closures of my invention are manufactured by methods which eliminate welding of segmented portions and the attendant problems which make it difficult and expensive to produce a satisfactory finished product. Thus, it can be seen that very little waste is produced, a feature which further increases economy.

The elimination of such steps as welding and grinding produces a product having superior attractiveness. This is a significant accomplishment since many trailers, such as horse trailers, are purchased as items for display.

In addition, greater flexibility is achieved since modifications to the shape of the closure may be made with very little expense. That is, the spinning technique is such that modifications to the size and configuration of the cup may be made quite conveniently. This flexibility decreases costs and further increases economy.

The foregoing disclosure and the showings made in the drawing are merely illustrative of the principles of my invention and are not to be interpreted in a limiting sense.

I claim:

1. The method of forming a closure between a wall member and a roof member of a trailer wherein one of said members is one-half of a longitudinally sectioned cylinder and the other of said members is symmetrically curved about an axis perpendicular to the axis of said cylinder, said method comprising the steps of:
   (a) spinning a cup-shaped intermediate element, the radius of which is identical with the radius of the cylindrical member;
   (b) dividing said element into two symmetrical pieces, the divided edges of which have a contour identical with the contour in transverse cross section of the other of said members, and
   (c) securing one of said divided pieces between said members.

2. The method of forming a closure between a cylindrical wall and a perpendicular, arcuate and symmetrically curved roof of a trailer, and said method comprising the steps of:
   (a) spinning a cup-shaped intermediate element, the radius of the circular edge of which is identical with the radius of the cylindrical wall;
   (b) dividing said element into two symmetrical pieces, the divided edges of which have a contour identical with that of the arcuate roof in transverse cross section; and
   (c) securing one of said divided pieces between said cylindrical wall and roof.

3. The method of forming a closure between an arcuate and symmetrically curved wall and a cylindrical and perpendicular roof of a trailer, said method comprising the steps of:
   (a) spinning a cup-shaped intermediate element, the radius of the circular edge of which is identical with the radius of the cylindrical roof;
   (b) dividing said element into two symmetrical pieces, the divided edges of which have a contour identical with that of the arcuate wall; and (c) securing one of said divided pieces between said curved wall and roof.

4. The method of forming a closure between a cylindrical wall and a perpendicular cylindrical roof of a trailer said cylindrical wall and roof having the same radii, said method comprising the steps of:
 (a) spinning a hemispherical intermediate element, the radius of which is equal to the radii of said cylindrical wall and roof;
 (b) dividing said element into two symmetrical pieces to form a closure which smoothly joins said cylindrical wall and roof; and
 (c) securing one of said divided pieces between said cylindrical wall and roof.

References Cited
UNITED STATES PATENTS 1,761,331   6/1930   Dewey _____ 113—116

FOREIGN PATENTS 445,377   4/1936   Great Britain.

RICHARD J. HERBST, *Primary Examiner.*